(12) United States Patent
Babcock et al.

(10) Patent No.: US 9,972,115 B2
(45) Date of Patent: May 15, 2018

(54) TIMELINE TOOL FOR PRODUCING COMPUTER-GENERATED ANIMATIONS

(71) Applicant: DreamWorks Animation LLC, Glendale, CA (US)

(72) Inventors: Michael Babcock, Glendale, CA (US); Fredrik Nilsson, Glendale, CA (US); Matthew Christopher Gong, Pasadena, CA (US)

(73) Assignee: DreamWorks Animation L.L.C., Universal City, CA (US)

( * ) Notice: Subject to any disclaimer, the term of this patent is extended or adjusted under 35 U.S.C. 154(b) by 0 days. days.

(21) Appl. No.: 14/737,207

(22) Filed: Jun. 11, 2015

(65) Prior Publication Data

US 2015/0363960 A1 Dec. 17, 2015

Related U.S. Application Data

(60) Provisional application No. 62/011,569, filed on Jun. 12, 2014.

(51) Int. Cl.
*G06T 13/00* (2011.01)
*G06T 13/40* (2011.01)

(52) U.S. Cl.
CPC .............. *G06T 13/40* (2013.01); *G06T 13/00* (2013.01); *G06T 2213/08* (2013.01)

(58) Field of Classification Search
CPC .................................................. G06T 13/40
USPC ........................................................ 345/473
See application file for complete search history.

(56) References Cited

U.S. PATENT DOCUMENTS

| | | | | |
|---|---|---|---|---|
| 5,659,369 A | * | 8/1997 | Imaiida | H04N 7/0122 348/240.2 |
| 7,336,279 B1 | * | 2/2008 | Takiguchi | G06F 17/30126 345/473 |
| 7,861,169 B2 | * | 12/2010 | Hull | G06F 3/1204 358/1.15 |
| 2003/0090523 A1 | * | 5/2003 | Hayashi | G06T 13/40 715/782 |

(Continued)

OTHER PUBLICATIONS

Extended European Search Report received for European Patent Application No. 15171850.9, dated Nov. 20, 2015, 4 pages.

(Continued)

*Primary Examiner* — Zhengxi Liu
*Assistant Examiner* — Yi Yang
(74) *Attorney, Agent, or Firm* — Dentons US LLP (57) ABSTRACT

A method of creating a computer-generated animation uses a graphical user interface including a two-dimensional array of cells. The array has a plurality of rows associated with visual characteristics of a computer-generated character and a plurality of columns associated with frames of the animation. The array includes a first cell associated with a first visual characteristic and a first frame. A first view of the array is displayed in which the first cell has a first width and includes a key frame indicator that indicates that a designated value is associated with the first visual characteristic for the first frame. A second view is displayed in which the first cell has a second width and includes an element value indicator. The second width is greater than the first width, and the element value indicator represents the value associated with the first visual characteristic.

24 Claims, 8 Drawing Sheets

(56) References Cited

U.S. PATENT DOCUMENTS

| | | | |
|---|---|---|---|
| 2004/0125124 A1* | 7/2004 | Kim | G06F 17/30799 715/716 |
| 2007/0101284 A1* | 5/2007 | Shaw | G06Q 10/107 715/772 |
| 2007/0247465 A1* | 10/2007 | Hadap | G06T 13/20 345/473 |
| 2012/0324357 A1* | 12/2012 | Viegers | G06F 3/0481 715/730 |
| 2013/0088495 A1* | 4/2013 | Bech | G06T 13/00 345/467 |
| 2013/0124990 A1* | 5/2013 | Lettau | G11B 27/34 715/716 |
| 2013/0271472 A1 | 10/2013 | Duran et al. | |

OTHER PUBLICATIONS

Intention to Grant received for European Patent Application No. 15171850.9, dated Aug. 3, 2016, 6 pages.

* cited by examiner

TIMELINE TOOL FOR PRODUCING COMPUTER-GENERATED ANIMATIONS

CROSS-REFERENCE TO RELATED APPLICATIONS

This application claims the benefit under 35 U.S.C. § 119(e) of U.S. Provisional Application No. 62/011,569, filed Jun. 12, 2014, the content of which is hereby incorporated by reference in its entirety for all purposes.

BACKGROUND

1. Field

This application relates generally to computer-generated animation, and more specifically, to a timeline tool for producing computer-generated animations.

2. Description of the Related Art

Computer animation is the process of generating animated images using computer graphics. A computer-generated scene may include a virtual environment including various objects (e.g., trees, rocks, clouds, etc.) and characters (animals, people, etc.). Models of characters, for example, may be created and then moved or deformed. Images of the scene are rendered at selected times or frames; when the frames are viewed in rapid succession, they give viewers the perception of animation.

A computer-generated character is typically modeled using a skeleton structure that is covered with a soft body layer that represents the skin, muscles, and soft tissue of the character. An artist can achieve the visual effect of animation through movement of the bones and joints in the skeleton structure. The soft body layer moves, or deforms, in response to movements of the skeleton structure. Because the soft body layer of a computer-generated character is outwardly visible to viewers of the computer animation, it is important that the soft body deformation impart a visually plausible appearance of the computer-generated character.

In some cases, achieving a visually plausible appearance requires defining the deformation of the soft body layer by manual input, which can be a time-consuming task. Thus, there is an opportunity to develop tools and techniques that make the process of manually defining the appearance of a character easier and more time-efficient.

SUMMARY

A method of creating a computer-generated animation uses a graphical user interface including a two-dimensional array of cells. The array has a plurality of rows and a plurality of columns. The rows are associated with visual characteristics of a computer-generated character, and the columns are associated with frames of the animation. The array includes a first cell associated with a first visual characteristic and a first frame. The method includes displaying a first view of the array including the first cell and a second view of the array including the first cell. In the first view, the first cell has a first width and a key frame indicator is displayed in the first cell. The key frame indicator indicates that a designated value is associated with the first visual characteristic for the first frame. In the second view, the first cell has a second width and an element value indicator is displayed in the first cell. The second width is greater than the first width. The element value indicator represents the value associated with the first visual characteristic. The value associated with the first visual characteristic may represent a position of a control point, which is a point on a curve that defines the shape of a portion of the computer-generated character.

In one embodiment, the element value indicator is displayed in response to the second width being greater than a predetermined threshold. In another embodiment, the element value indicator is displayed in response to the second width being larger than the width of the element value indicator.

In one embodiment, the method includes displaying a third view of the array including the first cell and modifying the appearance of the element value indicator. In the third view, the first cell has a third width that is greater than the second width.

In one embodiment, the method includes displaying a fourth view of the array including the first cell and removing the element value indicator. In the fourth view, the first cell has a fourth width that is less than the second width. The element value indicator may be removed in response to the fourth width being less than a predetermined threshold or in response to the fourth width being less than the width of the element value indicator.

In one embodiment, a system includes a display and a processing unit configured to perform the method described above. In another embodiment, a non-transitory computer-readable storage medium includes computer-executable instructions for performing the method described above.

The embodiments depicted in the figures are only exemplary. One skilled in the art will readily recognize from the following discussion that alternative embodiments of the structures and methods illustrated herein can be employed without departing from the principles described herein.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Figure 1:
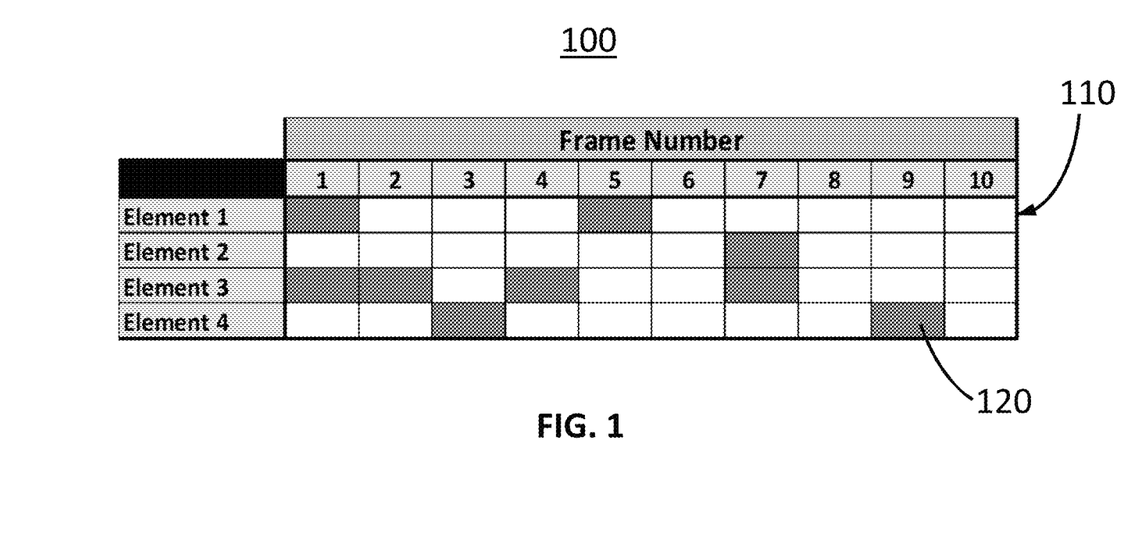
FIG. 1 depicts a timeline view of computer-generated animation data.

FIG. 1 depicts a timeline 100 of data associated with a computer-generated animation. The timeline 100 includes a two-dimensional array 110. Columns are associated with frames of the animation. Each frame may correspond to a time such that moving along the columns from left to right represents a progression of the animation through time. Rows of the array are associated with elements of the animation. An element may include an animation asset (e.g., a character or object), or some portion, feature, or characteristic thereof. Other examples of elements include a part of a character (e.g., a leg, arm, elbow, head, jaw, or the like) and visual characteristics of a part of a character (e.g., position, orientation, color, shape, size, etc.).

In one embodiment, a row is associated with a control point on a curve that defines the appearance of a portion of the computer-generated character. As mentioned above, the visual appearance of the character may be determined at least in part by the shape of the character's soft body layer. The surface of the character may be mapped to curves that can be deformed to cause the portions of the surface mapped thereto to deform. The shape of the curve is determined by control points on the curve, which can be positioned by an artist to achieve a desired appearance. The curves may also be referred to as a tracks or controls.

Figure 2A:
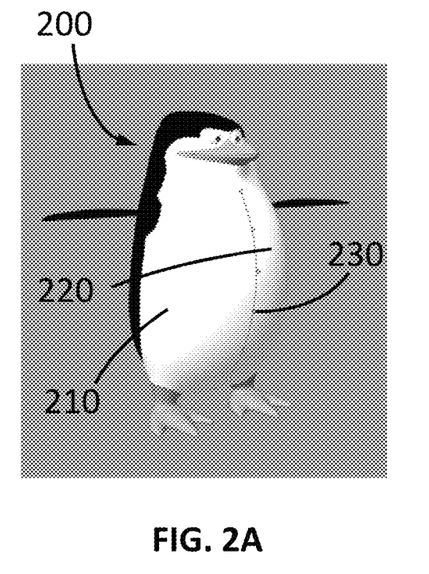
FIG. 2A-2B depict an exemplary computer-generated character with a deformation curve and control points.

FIG. 2A depicts an exemplary computer-generated character 200. The surface 210 of the character is mapped to curve 220. Control point 230 is one of six control points that can be positioned to change the shape of the curve 220 and thus the appearance of the character 200. For example, in FIG. 2B, the control points are moved away from the character's body causing the abdomen of the character to move or deform outward.

A character may be animated by assigning different values to the control points at different frames. However, a specific value does not need to be assigned to every control point for every frame. Values for a control point may be assigned at key frames to force the associated curve to have designated shapes at the key frames. The shape of the curve at intermediate frames may be interpolated based on the values of the control points at the key frames. An indicator may be displayed in a timeline view of the animation data to identify a frame as a key frame for a particular curve.

Returning to FIG. 1, a key cell (e.g., a cell in which the value of a control point is designated) includes an indicator that a designated value is assigned to the associated element for the associated frame. In FIG. 1, key cells, such as cell 120, are indicated by a dark grey color. It should be recognized, however, that various types of indicators may be used, including outlining or highlighting a cell, filling a cell with a color or pattern, or displaying an icon, shape, or symbol. The indicators provide a visual representation of how an element may be changing over a sequence of frames. Since the sequence of frames may be associated with a progression in time, the array 110 thus provides a timeline of the data underlying the animation.

In one embodiment, the view of the timeline includes all frames within the displayed range, including key frames and non-key frames. For example, timeline 100 includes columns for frames 1 through 10, including frames 6, 8, and 10 which are not key frames for any of the elements. The array 100 therefore provides a true indication of how asset features may be changing over time.

Figure 2B:
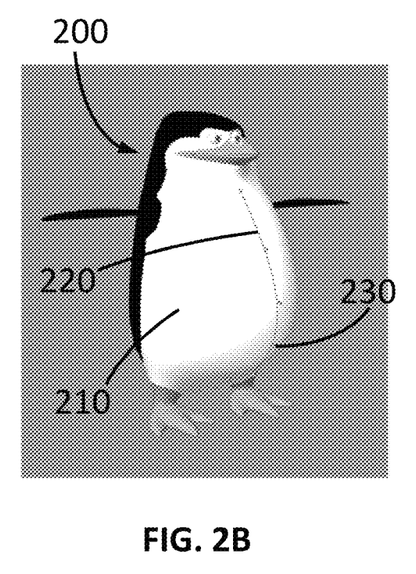

In one embodiment, Elements 1-4 in FIG. 1 are associated with curves, such as curve 220 in FIGS. 2A-2B. In this case, the designated key frames indicate to which frames values of the control points on the curves are assigned. FIG. 1 indicates that the control point associated with Element 1 has a defined value at frames 1 and 5, whereas the control point associated with Element 3 has defined values at frames 1, 2, 4, and 7. The key frame indicators may therefore provide an indication of how often or quickly an element, such as the abdomen, mouth, or other portion of an animated character, is moving.

Figure 3:
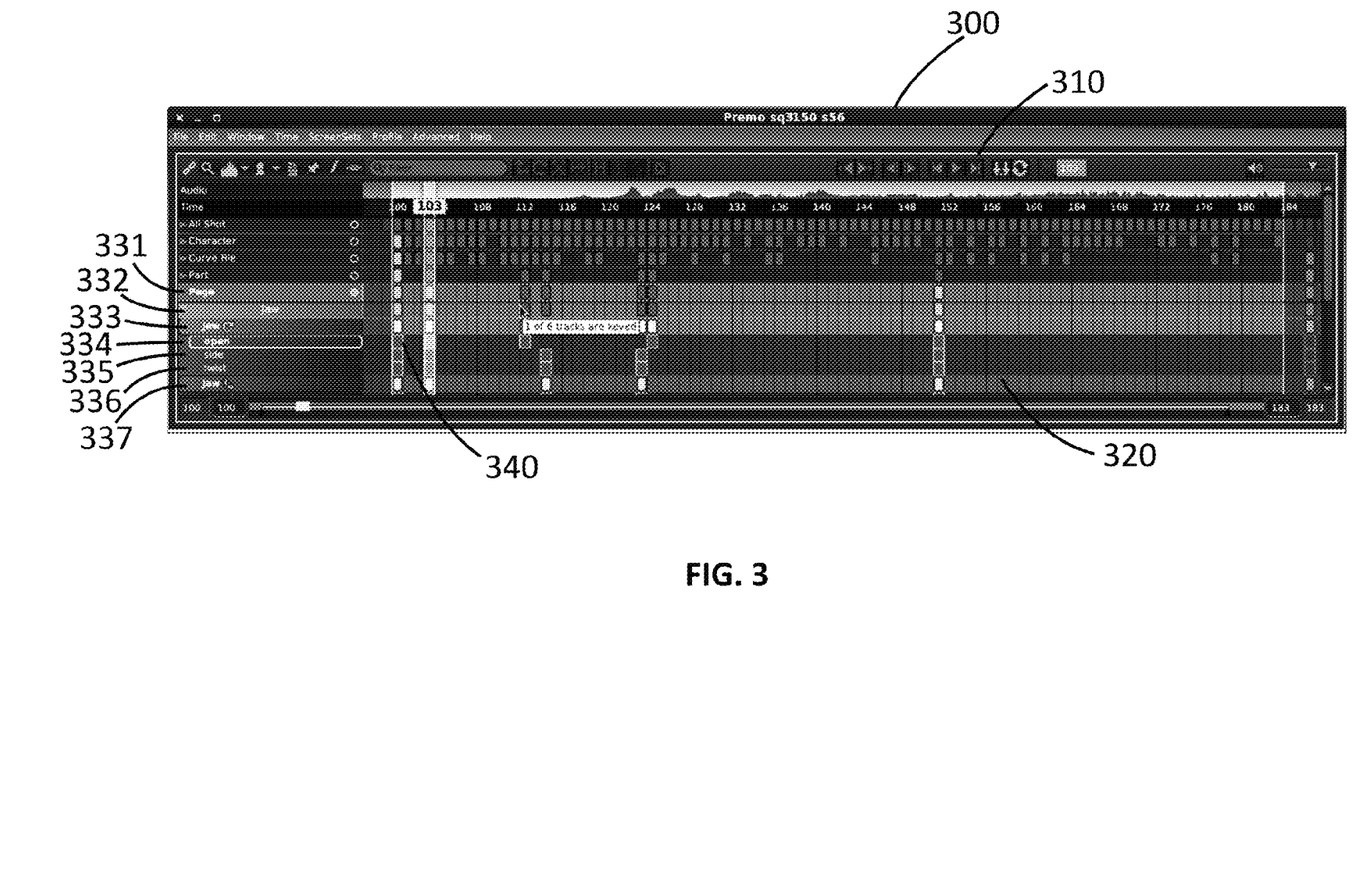
FIG. 3 depicts a GUI showing a timeline of data for creating a computer-generated animation.

A more detailed example of a timeline will now be described with reference to FIG. 3. FIG. 3 depicts a window 300 including a graphical user interface (GUI) 310 for producing a computer-generated animation. The GUI 310 includes a first view of a two-dimensional array of cells 320 that provides a timeline of data used for the computer-generated animation.

Figure 4A:
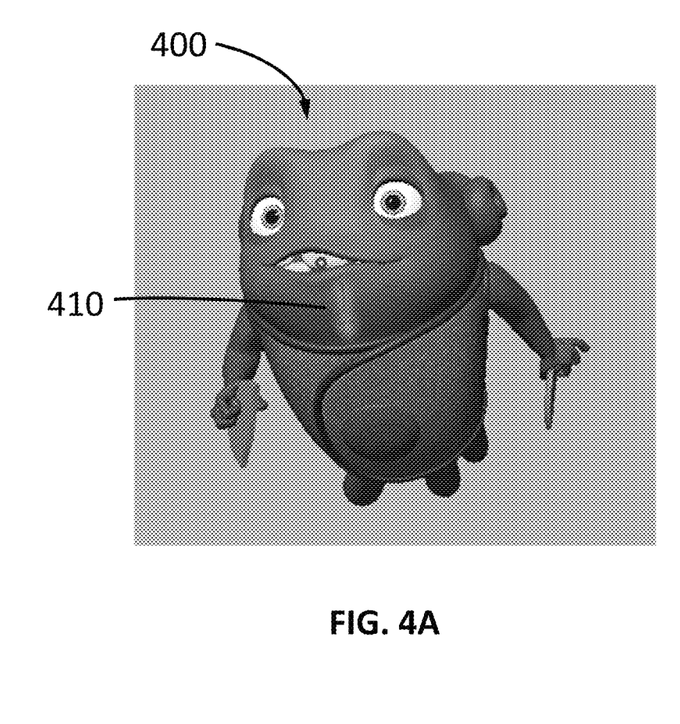
FIGS. 4A-4B depict an exemplary computer-generated character represented by the data in the timeline.
Figure 4B:
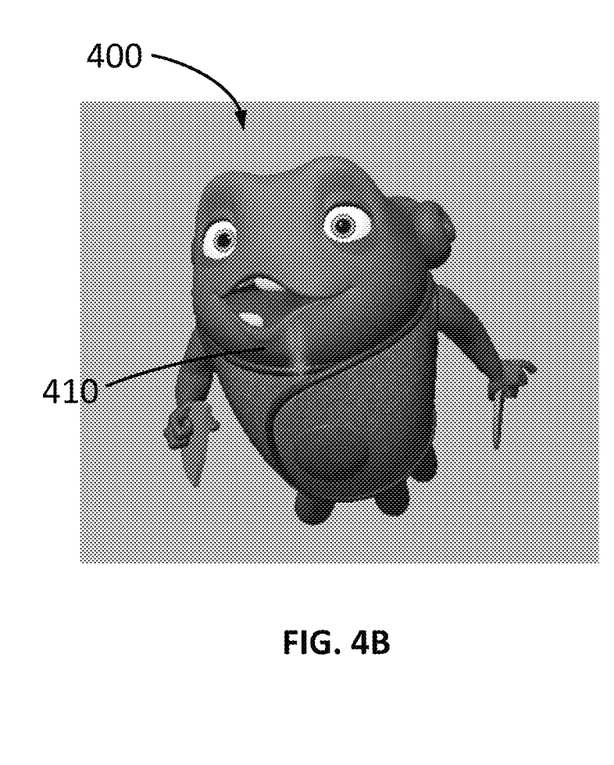

Rows of the array 320 are associated with elements of the animation, and columns are associated with frames of the animation. Row 331 is associated with a computer-generated character called Page. FIGS. 4A and 4B depict an exemplary computer-generated character 400 associated with row 331.

Returning to FIG. 3, a row may be selected/de-selected to display/hide additional rows. Row 331 is selected as indicated by the filled-in dot on the right side of the row. Underneath row 331 is row 332, which is associated with a part of character 400, specifically the jaw 410. Underneath row 332 are two rows associated with the position of the jaw 410. Row 333 is associated with the orientation of the jaw ("Jaw Orientation"), as indicated by the curved arrow icon, and row 337 is associated with the position of the jaw ("Jaw Position"), as indicated by the orthogonal arrows. Underneath row 333 are three visual characteristics that define the Jaw Orientation: open 334, side 335, and twist 336. Each characteristic of the Jaw Orientation is associated with a control point on a curve that defines the corresponding characteristic of the jaw's orientation.

For example, row 334 is associated with a control point on a curve that defines the amount that the jaw is open. The value of the control point can be changed to adjust the amount that the jaw 410 is open. In FIG. 4A, the jaw 410 is in a first position such that the mouth of character 400 is almost completely closed. By changing the value of the control point, the jaw 410 can be moved to a second position such that the mouth of character 400 is open, as shown in FIG. 4B.

In FIG. 3, a key frame for a particular control point is indicated by displaying a light, semi-transparent rectangle with a white border over the key cell. Indicator 340, for example, identifies frame 100 as a key frame for the "open" characteristic of the Jaw Orientation.

The cells of higher-level elements also include an indication when one or more of the control points associated with the element has a designated value at the associated frame. For example, since frame 100 is a key frame for the "open" characteristic of the orientation, the Page, Jaw, and Jaw Orientation cells at frame 100 include a rounded rectangle inside the cell.

As discussed above, the array 320 provides a visual indication of the way in which an asset may be changing over a sequence of frames. For example, the key cell indicators point out that the "open" characteristic for the Jaw Orientation has a defined value at frames 100, 103, 112, 124, 150, and 186, and that the "side" characteristic has defined values at frames 100, 103, 114, 123, 150, and 186.

Figure 5:
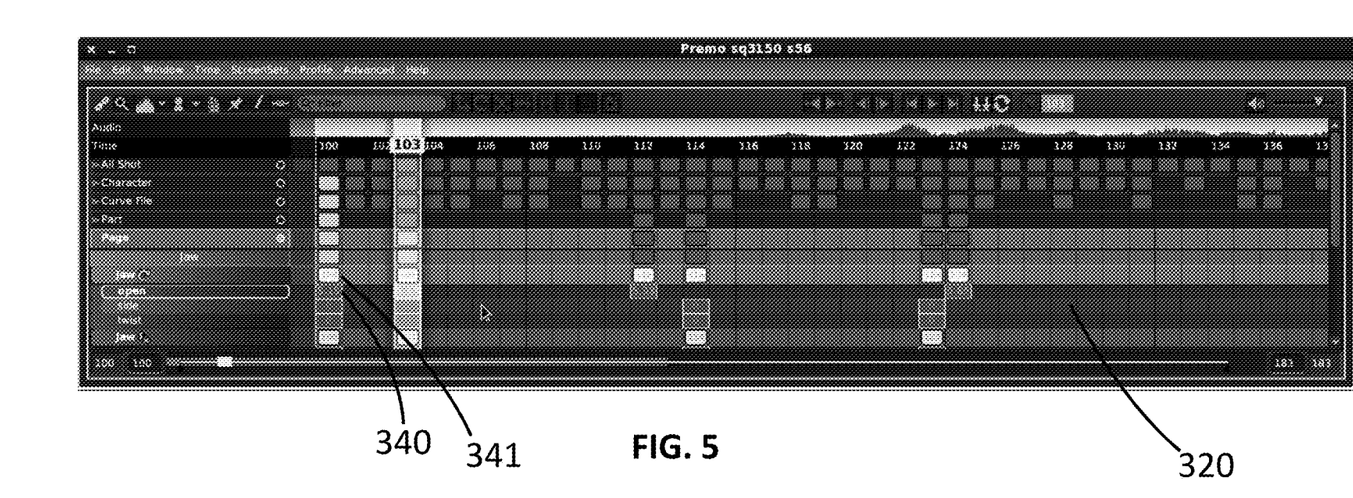
FIG. 5 depicts the GUI window showing a zoomed-in view of the timeline.

In one embodiment, the view of the timeline may be zoomed in and out along the frame/time dimension. FIG. 5 shows a second view of the array 320 that is zoomed in compared to the first view in FIG. 3. Zooming in increases the size of the cells in the frame dimension and causes fewer frames to be displayed. Conversely, zooming out from the second view to the first view decreases the size of the cells in the frame dimension and provides a view of more frames.

The frame dimension of array 320 is aligned horizontally since the frame number changes as you move horizontally along the timeline. Accordingly, compared to the first view, the horizontal widths of the cells are increased and fewer frames are displayed. In particular, frames 100-186 are displayed in FIG. 3, while frames 100-138 are displayed in FIG. 5.

As defined above, zooming in displays the cells on a larger scale and at a higher resolution (i.e., increases scale and resolution). Resolution is increased since more display pixels are used to display a cell. Conversely, zooming out decreases the size of the cells in the frame domain and causes more frames to be displayed. Thus, zooming out displays the cells on a smaller scale and at a lower resolution (i.e., decreases scale and resolution). Resolution is decreased since less display pixels are used to display a cell.

Furthermore, each view of the timeline may be associated with a level of zoom ("zoom level"). Zoom level is defined such that zooming in increases the zoom level (i.e., if a view is zoomed in, it has a higher zoom level). For example, the array 320 is displayed at a first zoom level in FIG. 3 and at a second zoom level in FIG. 5, where the second zoom level is greater than the first. A zoom level corresponds to a particular cell width, scale, and resolution. Thus, zoom level, cell width, scale, and resolution are all related indicators of how many cells are displayed along the frame dimension and, in the descriptions that follow, may be used interchangeably to refer to a change in the view of the timeline as a result of a zooming operation.

It should be recognized that in both the first view and the second view, the frame displayed on the left side of the timeline is fixed during the zoom operation. Frame 100 is displayed at the far left side at both the first and second views. It should be recognized, however, that the zoom operation may be performed in various other ways. As just one example, the frame in the center of the timeline could be fixed (e.g., frame 143 in FIG. 3) while the frame numbers on left and right sides increase or decrease as the view is zoomed.

It should also be recognized that in both views, the size of the cells in the element dimension (i.e., the vertical direction) does not change when the view is zoomed in and out. Therefore, zooming allows an artist to adjust the time scale to see more or less frames without changing which elements are displayed.

Notably, the first view of the timeline in FIG. 3 does not provide an indication of the actual values assigned to the elements at key frames. The actual values associated with elements (e.g., control points) may be stored in an underlying database or spreadsheet. An artist may be able to see the actual values by displaying the spreadsheet in a separate window or application. The spreadsheet, however, might display only the key frames, and therefore may not provide an accurate visual representation of the way in which the animation varies over time.

In the zoomed in view shown in FIG. 5, however, element value indicators are displayed in some of the cells. The indicators represent values related to the associated elements at the associated frame. For example, cell 341 includes text displaying the numeric value 100, which represents the frame number associated with the Jaw Orientation element at the identified cell.

Numbers are also displayed in the key cells associated with key frames of the Jaw Orientation characteristics (i.e., open, side, and twist). The numbers represent the values of the control points associated with the characteristics at key frames. For example, the control point for the "open" characteristic has a value of 5.15 at frame 100, 5.15 at frame 103, 5.33 at frame 112, and 5.65 at frame 124. The control point value of 5.15 corresponds to the first position of the jaw 410 of character 400 illustrated in FIG. 4A, and the value 5.65 corresponds to the second position illustrated in FIG. 4B. The second view thus displays a timeline that provides a true visual sense of how an element may be changing over time, while also providing spreadsheet data that allows an artist to see the actual values of animation elements at specific frames.

FIGS. 3 and 5 illustrate that the view of the array transitions from a timeline view to a hybrid timeline/spreadsheet view in response to being zoomed from a first zoom level to a second zoom level. When zooming in, the spreadsheet values are displayed in key cells in response to a threshold zoom level being reached. The values may appear at a predetermined zoom level that corresponds to a particular cell width. Alternatively, a value in a cell may appear when the width of the cell becomes large enough for the entire value to be displayed. Conversely, when zooming out, the values are removed from the cells when a threshold zoom level is reached. The threshold for displaying the values upon zooming in may be the same or different from the threshold for removing the values upon zooming out.

Accordingly, the mode in which the animation data is displayed (i.e., the timeline view or hybrid timeline/spreadsheet view) depends on the zoom level. Also, within the hybrid view, the display of the element value indicators may vary depending on the zoom level. For example, the font, color, size, or style of text may vary with zoom level. The display of the indicator may also fade in as the view is zoomed in and fade out as the view is zoomed out to provide a smooth transition between the timeline and hybrid views.

Figure 6:
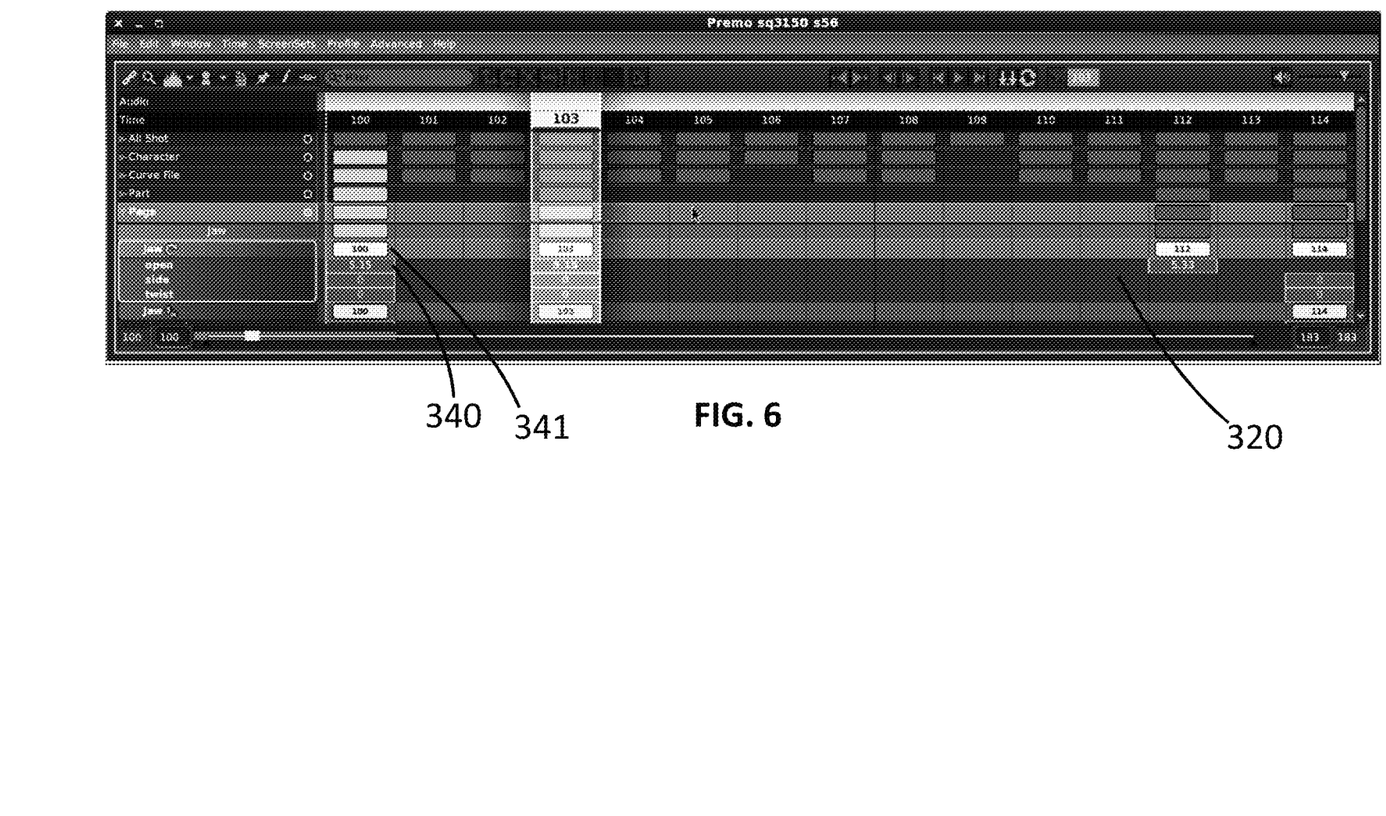
FIG. 6 depicts the GUI window showing a further zoomed-in view of the timeline.

FIG. 6 illustrates an example of the way in which the display of the element value indicator may vary with zoom level. FIG. 6 displays a third view of the timeline that is zoomed in even further than the second view in FIG. 5. In FIG. 5, the text in the key cells appears faint and dim, while in FIG. 6 the text is bold and distinct. Thus, the element value indicators become more distinct as the view is zoomed in.

It should be recognized that although text is used as an example of an element value indicator, other indicators such as colors, shapes, symbols, or the like, may be used to represent the value associated with an element. It should also be recognized that instead of a number, the value of an element may be, for example, a status, state, or description. Possible values may include, for example, ON, OFF, TRUE, FALSE, HIGH, MEDIUM, LOW, RED, GREEN, BLUE, etc.

Figure 7:
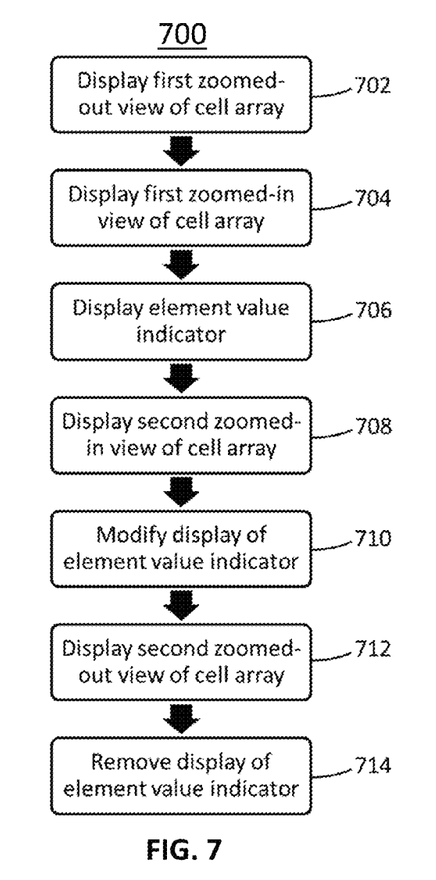
FIG. 7 depicts a flow chart of an exemplary process for displaying computer-generated animation data.

Turning now to FIG. 7, an exemplary process 700 for transitioning a display of an array of cells representing the data of a computer-generated animation (e.g., array 320 in FIG. 3) between a timeline view and a hybrid timeline/spreadsheet view is described.

In step 702, a first zoomed-out view of the cell array is displayed. The first zoomed-out view does not include element value indicators in the key cells. However, the first zoomed-out view may include indicators that identify key cells. For example, the first zoomed-out view may be the view depicted in FIG. 3.

In step 704, a first zoomed-in view of the cell array is displayed in place of the first zoomed-out view. The first zoomed-in view is zoomed in along the time dimension such that the cell size along the time dimension is larger than in the first zoomed-out view and fewer cells are displayed along the time dimension. The first zoomed-in view may be, for example, the view depicted in FIG. 5.

In step 706, an element value indicator is displayed in a cell. The element value indicator may be displayed in response to indicator display criteria being met. For example, the indicator may be displayed in response to the view being zoomed in beyond a predetermined zoom level or to a zoom level at which the cell size is at least the size of the indicator to be displayed.

In step 708, a second zoomed-in view of the cell array is displayed. The second zoomed-in view is zoomed in along the time dimension relative to the first zoomed-out view, but may be either zoomed in or zoomed out relative to the first zoomed-in view. For example, the second zoomed-in view may be the view depicted in FIG. 6.

In step 710, the display of the element value indicator is modified. If the second zoomed-in view is zoomed in compared to the first zoomed-in view, the display of the element value indicator may be made more pronounced by, for example, increasing the size, contrast, and/or boldness of the indicator. If the second zoomed-in view is zoomed out compared to the first zoomed-in view, the display of the element value indicator may be made more subdued by, for example, decreasing the size, contrast, and/or boldness of the indicator.

In step 712, a second zoomed-out view of the cell array is displayed. The second zoomed-out view is zoomed out relative to the first and second zoomed-in views, but may be either zoomed in or out relative to the first zoomed-out view.

In step 714, the display of the element value indicator is removed. The element value indicator may be removed in response to indicator removal criteria being met. For example, the element value indicator may be removed in response to the view being zoomed out beyond a predetermined zoom level to a zoom level at which the cell size is smaller than the size of the indicator to be displayed.

In addition to displaying spreadsheet data (e.g., frame numbers and element values) in a timeline view, functionality commonly found in spreadsheets may also be provided for the cells of a displayed array. For example, a value may be assigned to a cell by selecting the cell and typing or selecting a value, which could then be stored in an underlying database or spreadsheet version of the animation data. A value in a cell may also be edited, deleted, copied, pasted, and/or moved from one cell to another. Multiple cells may be selected simultaneously and the corresponding values of the selected cells can be moved together such that the relationship between the values in the frame domain remains the same. For example, in array 320, the cells associated with the "open", "side", and "twist" characteristics at frames 100 and 103 frames may be selected and their values dragged together to frames 106 and 109. In terms of the animation, moving the value of a control point to a different frame shifts the time at which the associated animation element achieves its specified position. Moving the value may also accelerate or decelerate the motion of the element.

Having spreadsheet functionality in a timeline view may provide several advantages over manipulating animation data solely in a spreadsheet. Depending on the format of the spreadsheet, it may be difficult to move element values to different frames. For example, if a spreadsheet does not include placeholders for non-key frames, it may be difficult to move data from a key frame to a non-key frame without having to add a new frame to the spreadsheet. By contrast, since the hybrid timeline/spreadsheet view described above includes all frames, large blocks of values may be moved easily from key frames to non-key frames.

Also, it should be recognized that although the spreadsheet capabilities described above would most likely be used in the hybrid view in which the values are displayed, the spreadsheet capabilities may be implemented and used in both the timeline view and the hybrid view.

Figure 8:
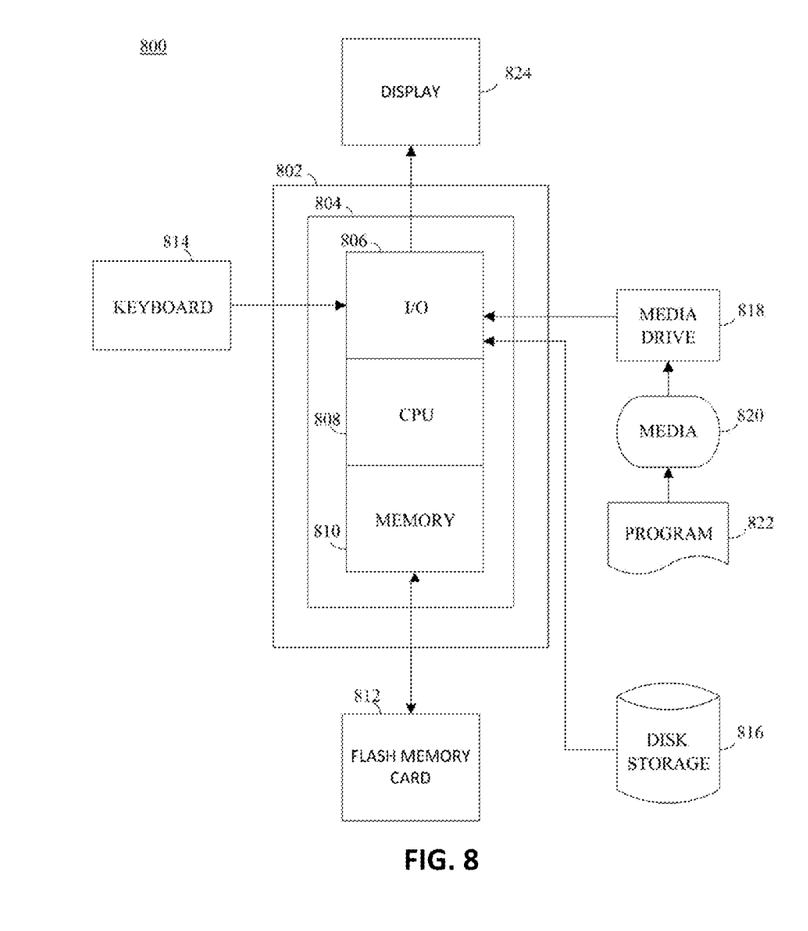
FIG. 8 depicts an exemplary computing system.

Turning now to FIG. 8, components of an exemplary computing system 800, configured to perform any of the above-described processes and/or operations, are depicted. Computing system 800 may include, for example, a processor, memory, storage, and input/output devices (e.g., monitor, keyboard, stylus, drawing device, disk drive, Internet connection, etc.). However, computing system 800 may include circuitry or other specialized hardware for carrying out some or all aspects of the processes. In some operational settings, computing system 800 may be configured as a system that includes one or more units, each of which is configured to carry out some aspects of the processes either in software, hardware, or some combination thereof.

In computing system 800, the main system 802 may include a motherboard 804 with a bus that connects an input/output (I/O) section 806, one or more central processing units (CPU) 808, and a memory section 810, which may have a flash memory card 812 related to it. Memory section 810 may contain computer-executable instructions and/or data for carrying out process 700. The I/O section 806 may be connected to display 824, a keyboard 814, a disk storage unit 816, and a media drive unit 818. The media drive unit 818 can read/write a non-transitory computer-readable storage medium 820, which can contain programs 822 and/or data.

Additionally, a non-transitory computer-readable storage medium can be used to store (e.g., tangibly embody) one or more computer programs for performing any one of the above-described processes by means of a computer. The computer program may be written, for example, in a general-purpose programming language (e.g., Pascal, C, C++, Java, or the like) or some specialized application-specific language.

Various exemplary embodiments are described herein. Reference is made to these examples in a non-limiting sense. They are provided to illustrate more broadly applicable aspects of the disclosed technology. Various changes can be made and equivalents can be substituted without departing from the true spirit and scope of the various embodiments. In addition, many modifications can be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features which can be readily separated from or combined with the features of any of the other several embodiments without departing from the scope or spirit of the various embodiments.

We claim:

1. A method of creating a computer-generated animation using a graphical user interface including a two-dimensional array of cells, the array having a plurality of rows and a plurality of columns, wherein the cells are visually distinguished from each other along the rows and columns, wherein the rows are associated with visual characteristics of a computer-generated character and the columns are associated with frames of the animation, and wherein the array includes a first cell associated with a first visual characteristic of the computer-generated character in a first frame of the computer-generated animation, the method comprising:

displaying a first view of the array including the first cell, the first cell having a first width in the first view;

displaying, in the first view, a key frame indicator in the first cell, wherein the key frame indicator indicates that a designated value is associated with the first visual characteristic of the computer-generated character for the first frame of the computer-generated animation; and zooming the two-dimensional array of cells, wherein zooming the two-dimensional array of cells includes:

displaying a second view of the array including the first cell, the first cell having a second width in the second view, wherein the second width is greater than the first width; and displaying, in the second view, an element value indicator in the first cell, wherein the element value indicator is distinct from an image of the first frame of the computer-generated animation, wherein the element value indicator, by itself, represents the value associated with the first visual characteristic of the computer-generated animation in the first frame of the computer-generated animation, and wherein the first visual characteristic of the computer-generated character in the first frame of the computer-generated animation associated with the value represented by the element value indicator includes a shape of a portion of the computer-generated character in the first frame of the computer-generated animation.

2. The method of claim 1, wherein the value associated with the first visual characteristic represents a position of a control point, wherein the control point is a point on a curve that defines the shape of the portion of the computer-generated character.

3. The method of claim 1, wherein the element value indicator is displayed in response to the second width being greater than a predetermined threshold.

4. The method of claim 1, wherein the element value indicator is displayed in response to the second width being larger than the width of the element value indicator.

5. The method of claim 1, further comprising:
displaying a third view of the array including the first cell, the first cell having a third width in the third view, wherein the third width is greater than the second width; and
modifying the appearance of the element value indicator.

6. The method of claim 1, further comprising:
displaying a fourth view of the array including the first cell, the first cell having a fourth width in the fourth view, wherein the fourth width is less than the second width; and
removing the element value indicator.

7. The method of claim 6, wherein the element value indicator is removed in response to the fourth width being less than a predetermined threshold.

8. The method of claim 6, wherein the element value indicator is removed in response to the fourth width being less than the width of the element value indicator.

9. A system for creating a computer-generated animation, the system comprising:
a display; and
a processing unit configured to:
display, at the display:
a graphical user interface including a two-dimensional array of cells, the array having a plurality of rows and a plurality of columns, wherein the cells are visually distinguished from each other along the rows and columns, wherein the rows are associated with visual characteristics of a computer-generated character and the columns are associated with frames of the animation, and wherein the array includes a first cell associated with a first visual characteristic of the computer-generated character in a first frame of the computer-generated animation;
a first view of the array including the first cell, the first cell having a first width in the first view; and
a key frame indicator, wherein the key frame indicator is displayed in the first cell in the first view, and wherein the key frame indicator indicates that a designated value is associated with the first visual characteristic of the computer-generated character for the first frame of the computer-generated animation; and
zoom the two-dimensional array of cells, wherein zooming the two-dimensional array of cells includes:
displaying a second view of the array including the first cell, the first cell having a second width in the second view, wherein the second width is greater than the first width; and
displaying an element value indicator, wherein the element value indicator is displayed in the first cell in the second view, wherein the element value indicator is distinct from an image of the first frame of the computer-generated animation, wherein the element value indicator, by itself, represents the value associated with the first visual characteristic of the computer-generated animation in the first frame of the computer-generated animation, and wherein the first visual characteristic of the computer-generated character in the first frame of the computer-generated animation associated with the value represented by the element value indicator includes a shape of a portion of the computer-generated character in the first frame of the computer-generated animation.

10. The system of claim 9, wherein the value associated with the first visual characteristic represents a position of a control point, wherein the control point is a point on a curve that defines the shape of the portion of the computer-generated character.

11. The system of claim 9, wherein the element value indicator is displayed in response to the second width being greater than a predetermined threshold.

12. The system of claim 9, wherein the element value indicator is displayed in response to the second width being larger than the width of the element value indicator.

13. The system of claim 9, wherein the processing unit is further configured to:
display a third view of the array including the first cell, the first cell having a third width in the third view, wherein the third width is greater than the second width; and
modify the appearance of the element value indicator.

14. The system of claim 9, wherein the processing unit is further configured to:
display a fourth view of the array including the first cell, the first cell having a fourth width in the fourth view, wherein the fourth width is less than the second width; and
remove the element value indicator.

15. The system of claim 14, wherein the element value indicator is removed in response to the fourth width being less than a predetermined threshold.

16. The system of claim 14, wherein the element value indicator is removed in response to the fourth width being less than the width of the element value indicator.

17. A non-transitory computer-readable storage medium comprising computer-executable instructions for creating a computer-generated animation, the computer-executable instructions comprising instructions for:
   displaying a graphical user interface including a two-dimensional array of cells, the array having a plurality of rows and a plurality of columns, wherein the cells are visually distinguished from each other along the rows and columns, wherein the rows are associated with visual characteristics of a computer-generated character and the columns are associated with frames of the animation, and wherein the array includes a first cell associated with a first visual characteristic of the computer-generated character in a first frame of the computer-generated animation;
   displaying a first view of the array including the first cell, the first cell having a first width in the first view;
   displaying, in the first view, a key frame indicator in the first cell, wherein the key frame indicator indicates that a designated value is associated with the first visual characteristic of the computer-generated character for the first frame of the computer-generated animation;
   zooming the two-dimensional array of cells, wherein zooming the two-dimensional array of cells includes:
      displaying a second view of the array including the first cell, the first cell having a second width in the second view, wherein the second width is greater than the first width; and
      displaying, in the second view, an element value indicator in the first cell, wherein the element value indicator is distinct from an image of the first frame of the computer-generated animation, wherein the element value indicator, by itself, represents the value associated with the first visual characteristic of the computer-generated character in the first frame of the computer-generated animation, and wherein the first visual characteristic of the computer-generated character in the first frame of the computer-generated animation associated with the value represented by the element value indicator includes a shape of a portion of the computer-generated character in the first frame of the computer-generated animation.

18. The computer-readable storage medium of claim 17, wherein the value associated with the first visual characteristic represents a position of a control point, wherein the control point is a point on a curve that defines the shape of the portion of the computer-generated character.

19. The computer-readable storage medium of claim 17, wherein the element value indicator is displayed in response to the second width being greater than a predetermined threshold.

20. The computer-readable storage medium of claim 17, wherein the element value indicator is displayed in response to the second width being larger than the width of the element value indicator.

21. The computer-readable storage medium of claim 17, further comprising instructions for:
   displaying a third view of the array including the first cell, the first cell having a third width in the third view, wherein the third width is greater than the second width; and
   modifying the appearance of the element value indicator.

22. The computer-readable storage medium of claim 17, further comprising instructions for:
   displaying a fourth view of the array including the first cell, the first cell having a fourth width in the fourth view, wherein the fourth width is less than the second width; and
   removing the element value indicator.

23. The computer-readable storage medium of claim 22, wherein the element value indicator is removed in response to the fourth width being less than a predetermined threshold.

24. The computer-readable storage medium of claim 22, wherein the element value indicator is removed in response to the fourth width being less than the width of the element value indicator.

* * * * *